US011171891B2

(12) United States Patent
Srivastava et al.

(10) Patent No.: US 11,171,891 B2
(45) Date of Patent: Nov. 9, 2021

(54) CONGESTION DROP DECISIONS IN PACKET QUEUES

(71) Applicant: Ciena Corporation, Hanover, MD (US)

(72) Inventors: Vaibhav Srivastava, Gurgaon (IN);
Keith Michael Bly, Newman Lake, WA (US)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 16/558,405

(22) Filed: Sep. 3, 2019

(65) Prior Publication Data
US 2021/0021545 A1    Jan. 21, 2021

(30) Foreign Application Priority Data
Jul. 19, 2019  (IN) .............................. 201911029236

(51) Int. Cl.
*H04L 12/861*    (2013.01)
*H04L 12/801*    (2013.01)

(52) U.S. Cl.
CPC .......... *H04L 49/9089* (2013.01); *H04L 47/12* (2013.01); *H04L 49/9005* (2013.01); *H04L 49/9036* (2013.01)

(58) Field of Classification Search
None
See application file for complete search history.

(56) References Cited

U.S. PATENT DOCUMENTS

| 5,742,760 | A | * | 4/1998 | Picazo, Jr. | .............. H04L 12/44 370/351 |
| 6,940,808 | B1 | | 9/2005 | Shields et al. | |
| 6,961,307 | B1 | | 11/2005 | Aweya et al. | |
| 7,269,180 | B2 | | 9/2007 | Bly et al. | |
| 7,272,149 | B2 | | 9/2007 | Bly et al. | |
| 7,272,150 | B2 | | 9/2007 | Bly et al. | |
| 7,349,960 | B1 | | 3/2008 | Pothier et al. | |
| 8,094,559 | B1 | | 1/2012 | Bly et al. | |
| 2002/0071387 | A1 | * | 6/2002 | Horiguchi | ............... H04L 47/32 370/229 |
| 2003/0067877 | A1 | * | 4/2003 | Sivakumar | ..... H04N 21/234327 370/232 |
| 2012/0224480 | A1 | * | 9/2012 | Nakash | ................... H04L 47/12 370/230 |
| 2016/0379493 | A1 | | 12/2016 | Bhuiya et al. | |
| 2017/0134282 | A1 | * | 5/2017 | Agarwal | ................ H04L 47/32 |
| 2018/0302311 | A1 | | 10/2018 | Holness | |

* cited by examiner

*Primary Examiner* — James P Duffy
(74) *Attorney, Agent, or Firm* — Clements Bernard Baratta; Lawrence A. Baratta, Jr.; Christopher L. Bernard

(57) ABSTRACT

A packet switch includes an ingress port; queue admission control circuitry connected to the ingress port; one or more egress queues configured to manage packet buffers; and an egress port connected to the packet buffers, wherein the packet buffers are managed such that already queued lower priority packets are discarded from the packet buffers when it is required to drop higher priority packets that should otherwise be accepted in the packet buffers. The queue admission control circuitry can be configured to determine if a packet should be dropped or not, and the queue admission control circuitry communicates to buffer reallocation circuitry that is configured to discard one or more lower priority packets to support enqueuing the higher priority packet.

20 Claims, 15 Drawing Sheets

| Time | t0 | t1 | t2 | t3 | t4 | t5 | t6 | t7 | t8 | t9 |
|---|---|---|---|---|---|---|---|---|---|---|
| Ingress Service Frame | NA | 20 (SQ-2) | 40 (SQ-1) | 20 (SQ-3) | 40 (SQ-2) | 20 (SQ-3) | 20 (SQ-2) | 40 (SQ-3) | 20 (SQ-1) | 40 (SQ-3) |
| $AQS_3^x$ | 100 | 100 | 100 | 80 | 80 | 60 | 60 | 20 | 20 | 0 |
| $AQS_2^x$ | 100 | 80 | 80 | 60 | 20 | 0 | 0 | 0 | 0 | 0 |
| $AQS_1^x$ | 100 | 80 | 40 | 20 | 0 | 0 | 0 | 0 | 0 | 0 |
| $UQS_3^x$ | 0 | 0 | 0 | 20 | 20 | 40 | 40 | 80 | 80 | 100 |
| $UQS_2^x$ | 0 | 20 | 40 | 20 | 60 | 60 | 60 | 20 | 20 | 0 |
| $UQS_1^x$ | 0 | 0 | 0 | 40 | 20 | 0 | 0 | 0 | 0 | 0 |
| $\sum_{i=1}^{3} UQS_i^x$ | 0 | 20 | 60 | 80 | 100 | 100 | 100 | 100 | 100 | 100 |
| DropQueue | 0 | 0 | 0 | 0 | 20 (SQ-1) | 20 (SQ-1) | 20 (SQ-2) | 40 (SQ-2) | 0 | 20 (SQ-2) |
| Packet Drop | 0 | 0 | 0 | 0 | 0 | 0 | 0 | 0 | 20 (SQ-1) | 20 (SQ-3) |

*FIG. 16*

CONGESTION DROP DECISIONS IN PACKET QUEUES

FIELD OF THE DISCLOSURE

The present disclosure generally relates to packet networking. More particularly, the present disclosure relates to systems and methods for improved congestion drop decisions in packet queues which drop already queued lower priority frames when there is a requirement to drop higher priority frames that have not yet been queued.

BACKGROUND OF THE DISCLOSURE

Whenever a packet arrives at a switch or router, it is stored in packet buffers that are memory used to store packet data, and that is shared across all the ports in the device. Packet queues are generally a list or the like that point to packets in the packet buffers. A switch may have multiple queues such as for different applications/Quality of Service (QoS) requirements. Packet buffers and queues are an expensive resource. Packet buffers are generally shared among all the ports and queues of the device. Of course, there is a requirement for efficient management of the packet buffers. When the ingress rate is less than the egress rate, egress queues for a port do not build up, i.e., they drain efficiently. However, when the ingress rate is more than the egress rate, the egress queue starts building up, and packets can be dropped if the egress queue size (queue-depth) reaches beyond a configured threshold. So, in the case of congestion, packets can get dropped when no allocated packet buffers are left for an egress queue. There are existing congestion avoidance algorithms available, such as Weighted Random Early Detection (WRED), Random Early Detection (RED), color-aware tail-drop, etc., which are used to drop the packets based on the configured queue thresholds. Queue thresholds are defined based on different parameters, such as, for example, in color-aware tail-drop, thresholds are based on the color of the packets whereas in WRED thresholds are based on precedence (priority) of the frames.

In the case of color-aware tail-drop, different queue thresholds are configured for different color of frames. In general, frames are marked as green, yellow, or red where green frames have higher priority than yellow and yellow have higher priority than red. Thresholds are set such as if the queue length reaches the threshold value of red color frames then all the red color frames will be dropped and will not be queued making rest of the queue available for higher precedence color frames (green and yellow). The RED and WRED are congestion avoidance techniques which use a minimum threshold (start point), maximum threshold (endpoint) and drop probability to decide which frame to drop. Drop probability decides the slope between a start and end threshold to drop the frame.

In general, congestion avoidance algorithms start dropping the frames well before the queue is full so that space is available for higher precedence frames at a later stage. This will save dropping the higher precedence frames. If no congestion avoidance algorithm is used, then frames will be tail dropped without considering the precedence of the frames. The tail drop means when a queue is full, newly arriving packets for that queue are dropped until there is room. In both cases, where the congestion avoidance algorithm is used or not, drop decisions do not consider the precedence of the already queued frames.

Existing congestion avoidance algorithms consider the current queue length or average queue length for all calculations, whereas it does not consider if lower precedence or higher precedence frames have already occupied the queue. That means drop decisions are not influenced by the precedence of already queued frames. This is not an efficient approach to manage limited resources.

BRIEF SUMMARY OF THE DISCLOSURE

In an embodiment, a packet switch includes an ingress port; queue admission control circuitry connected to the ingress port; one or more egress queues configured to manage packet buffers; and an egress port connected to the packet buffers, wherein the packet buffers are managed such that already queued lower priority packets are discarded from the packet buffers when it is required to drop higher priority packets that should otherwise be accepted in the packet buffers. The packet switch can further include buffer reallocation circuitry connected to the queue admission control circuitry, wherein the buffer reallocation circuitry is configured to cause discard of the lower priority packets to support the higher priority packets. The queue admission control circuitry can be configured to determine if a packet should be dropped or not, and the queue admission control circuitry communicates to buffer reallocation circuitry that is configured to discard one or more lower priority packets to support the packet.

The queue admission control circuitry can perform congestion avoidance, and, responsive to a decision to queue a higher priority packet from the congestion avoidance, buffer reallocation circuitry can be configured to make room in the packet buffers by discarding the lower priority packets. The queue admission control circuitry may not perform congestion avoidance, and, responsive to a tail drop decision of a higher priority packet, buffer reallocation circuitry can be configured to make room in the packet buffers by discarding the lower priority packets. The one or more egress queues can be linked lists to the packet buffers and the discard is performed by removing nodes in the linked lists. The one or more egress queues can include a plurality of queues each supporting a different priority level. A queue of the one or more egress queues can support packets each having different priority levels, and wherein the packet buffers can be managed by discarding already queued lower priority packets in the queue when it is required to discard a higher priority packet that has not been queued yet in the queue.

In another embodiment, an apparatus includes queue admission control circuitry configured to receive a packet at priority P, and determine whether to drop or queue the packet in packet buffers; and buffer reallocation circuitry configured to discard one or more already queued packets in the packet buffers responsive to a decision to queue the packet from the queue admission control circuitry for the packet and with no room in the packet buffers, wherein the one or more already queued packets have a lower priority than priority P. The queue admission control circuitry can perform congestion avoidance, and, responsive to the decision from the congestion avoidance of a higher priority packet, the buffer reallocation circuitry can be configured to make room in the packet buffers by discarding the one or more already queued packets. The queue admission control circuitry may not perform congestion avoidance, and, responsive to a tail drop decision of a higher priority packet, the buffer reallocation circuitry can be configured to make room in the packet buffers by discarding the one or more already queued packets. The apparatus can further include one or more egress queues that are linked lists to the packet buffers and the discard is performed by removing nodes in the linked lists. The packet buffers can be managed by a plurality of egress queues each supporting a different priority level. The packet buffers can be managed by a queue of one or more egress queues that supports packets each having different priority levels, and wherein the packet buffers can be managed by discarding already queued packets in the queue when it is required to discard a higher priority packet that has not been queued yet in the queue.

In a further embodiment, a method includes, in a packet switch, receiving a packet at priority P; determining whether to drop or enqueue the packet based on one or more of admission control and congestion avoidance control associated with packet buffers; and, responsive to a decision to queue the packet and with no room in the packet buffers, determining whether to drop one or more already enqueued packets that have a priority lower than P, to provide room for the packet despite the drop decision. The method can further include one of i) dropping the packet if unable to provide the room and ii) discarding the one or more already enqueued packets, and enqueuing the packet. The decision can be based on the congestion avoidance control and the decision can be revisited subsequently to drop one or more already enqueued packets. The decision can be based on admission control without the congestion avoidance control, and the decision can be a tail drop decision. The packet switch can include a plurality of egress queues each supporting a different priority level, and the one or more already enqueued packets can be in a different queue than the packet. The packet switch can include a queue that supports packets each having different priority levels, and wherein the dropping can be performed in the queue.

BRIEF DESCRIPTION OF THE DRAWINGS

The present disclosure is illustrated and described herein with reference to the various drawings, in which like reference numbers are used to denote like system components/method steps, as appropriate, and in which:

FIG. 16 is a table illustrating which frames are enqueued and which are dropped in an example operation.

DETAILED DESCRIPTION OF THE DISCLOSURE

The present disclosure relates to systems and methods for improved congestion drop decisions in packet queues. Specifically, the present disclosure improves existing congestion avoidance algorithms by considering the precedence of already queued frames while dropping frames. The systems and methods include queue admission control based on precedence class that is assigned based on different packet attributes. As described herein, precedence and priority are the same concepts used to differentiate between frames or packets (also, the terms frames and packets are used interchangeably in the present disclosure). The systems and methods include dropping a lower priority already queued frame to make room for a higher priority frame when a congestion avoidance algorithm says to drop the higher priority frame. This improves the drop decision in the case of congestion such that the drop decision for higher priority frames will be delayed at the cost of dropping already queued lower priority frames. Further, this approach can be extended to where no congestion avoidance algorithm is used, and packets are dropped using a tail drop approach.

Switch/Router

Figure 1:
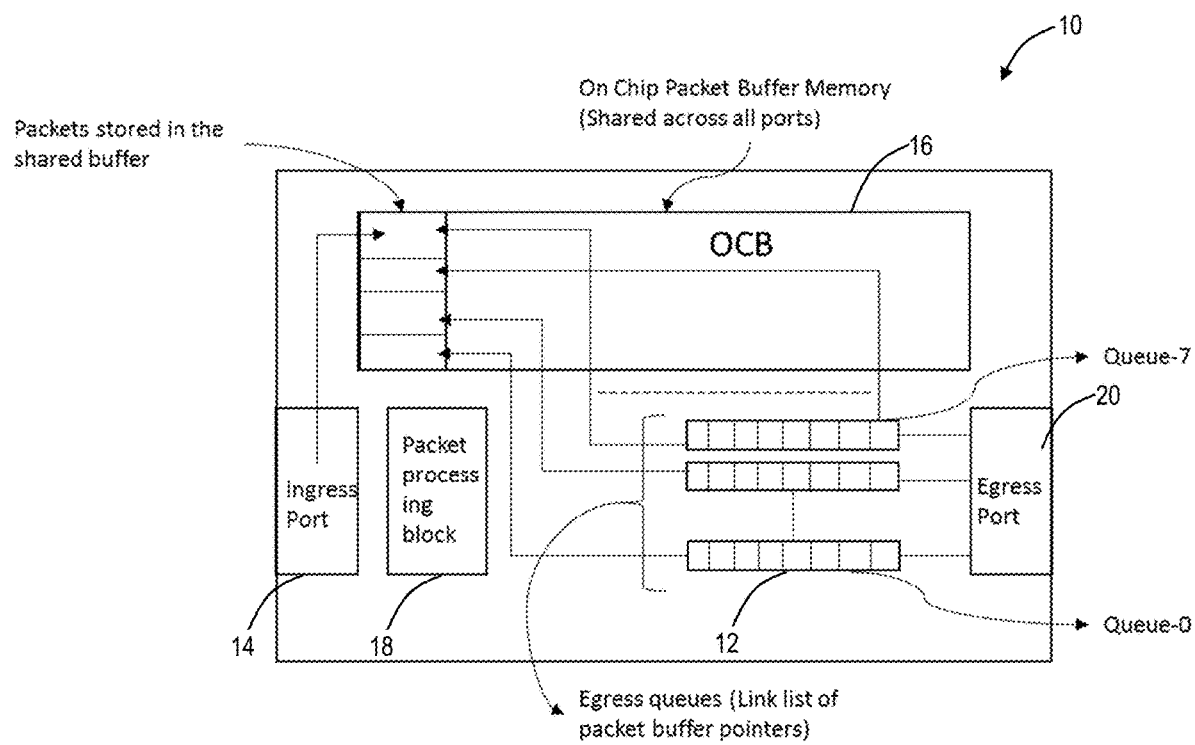
FIG. 1 is a block diagram of a packet switch illustrating functions therein.

FIG. 1 is a block diagram of a packet switch 10 illustrating functions therein. Data traffic in a network can include multiple flows (flow classification can be different for different customers), and flows can be bundled together for assigning egress queues 12 to give configured QoS treatment. Data network traffic can be categorized into multiple categories such as network control, connection-oriented, real-time, premium data, etc. to give different Quality of Service (QoS) treatment. Different egress queues 12 can be assigned to give different QoS treatment based on a different category of traffic. Whereas different flows can be present within the same category of traffic and require precedence over other flows while dropping the packets in case of congestion. For example, Simple Network Management Protocol (SNMP) informs/traps of a "primary link" may require more precedence over "secondary link" whereas both types of traffic are assigned the same priority (Class of Service) and same egress queue 12. Another example could be different control protocols such as management protocols generated by a host processor such as Telnet, SSH, DHCP, Syslog, etc. may require relative precedence within the same egress queue in case of congestion.

Whenever a packet arrives at the packet switch 10 at an ingress port 14, it is stored in packet buffers 16. The packet buffers 16 are memory which is used to store packet data and are shared across all the ports in the packet switch 10. The packet buffers 16 can be an "On-Chip Buffer" (OCB) which is an example of an implementation with limited memory. The present disclosure contemplated operation with an OCB as well as other implementations of the packet buffers 16. Packet descriptors or packet pointers are used to store a pointer of the first cell of a packet along with metadata and are used to process the packet from ingress to egress pipeline. Once the packet is processed in the ingress pipeline by a packet processing block 18, an egress queue 12 has been identified, and the packet is enqueued to that egress queue 12. Generally, egress queues 12 are implemented using link-list of packet pointers and size of the queue is configured such that all the egress queues 12 get fair access to the packet buffers 16 (shared memory). The packets are provided out of the egress queues 12 to an egress port 20.

Figure 2:
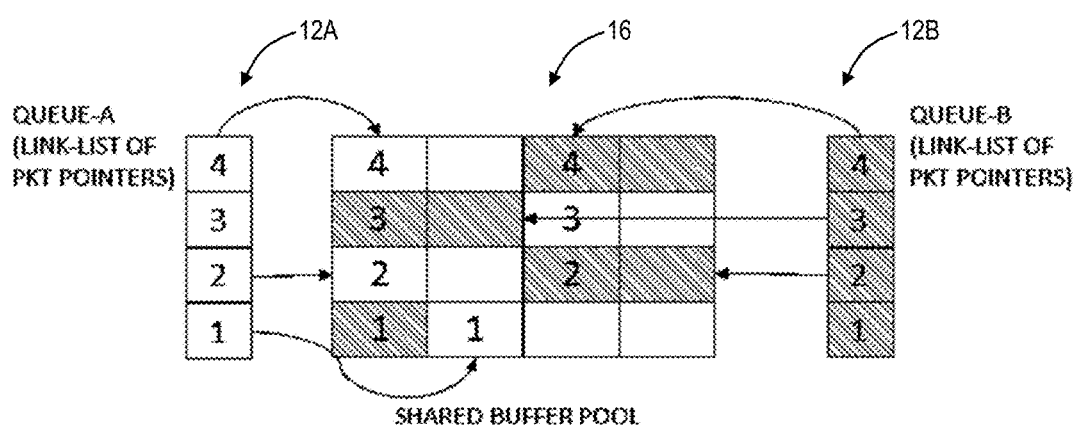
FIG. 2 is a block diagram of packet storage in the packet buffers.

FIG. 2 is a block diagram of packet storage in the packet buffers 16. The packet buffers 16 are memory shared among different queues 12 and utilized based on a first come, first serve basis. In the example of FIG. 2, the shared packet buffers 16 are shared among two different queues 12A, 12B and arrows illustrate how frames are arranged in the shared packet buffers 16.

Dropping Lower Priority Queued Frames

The present disclosure proposes to drop the lower priority already queued frame to make room for a higher priority frame when a congestion avoidance algorithm says to drop the higher priority frame. This improves drop decisions for congestion avoidance algorithms, i.e., preserves/queues high priority frames while dropping the lower priority already queued frames. This can also operate where no congestion avoidance algorithm is used, and packets are dropped using a tail drop approach. Here, the higher priority frames could be enqueued while dropping the lower priority frames.

Figure 3:
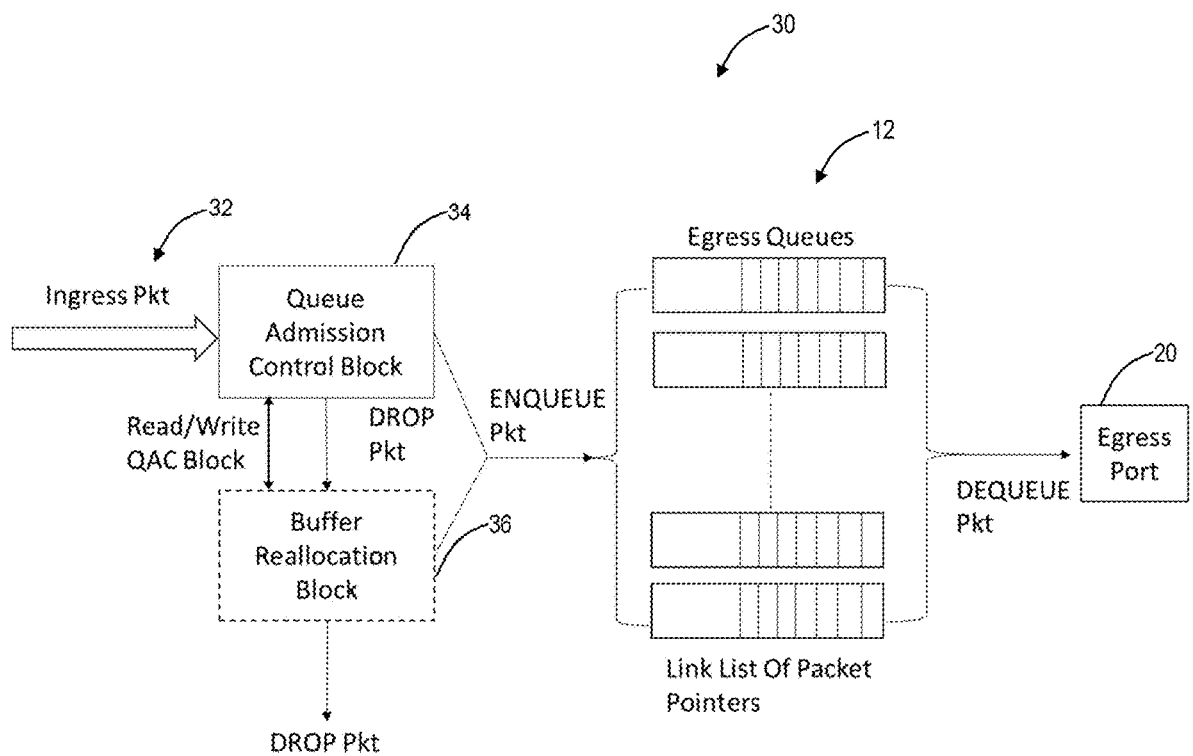
FIG. 3 is a block diagram of a queue admission system in the packet switch of FIG. 1.

FIG. 3 is a block diagram of a queue admission system 30 in the packet switch 10. An ingress packet 32 is received at a queue admission control block 34. Before enqueueing the ingress packet 32 to the egress queue 12, several admission control and congestion control tests are performed, and, if the ingress packet 32 passes the admission control and congestion control tests, then it is enqueued, else it is dropped. The queue admission control block 34 is configured to perform such admission control to check if the packet buffers 16, packet pointers and other system resources are available or not. The queue admission control block 34 is configured to perform the congestion control test to check if the ingress packet 32 should be dropped or not, to avoid congestion based on configured parameters. If no resources are available (admission control) or the congestion avoidance algorithm determines a drop, then the ingress packet 32 is dropped, else it is enqueued in a corresponding egress queue 12.

The queue admission system 30 further includes a buffer reallocation block 36 that determines if an already queued lower priority frames need to be dropped to enqueue the higher priority frames or just drop the frame. The queue admission system 30 can be selectively enabled or disable by a user. If the queue admission system 30 is disabled, and the queue admission control block 34 has decided to drop the ingress packet 32, then the ingress packet 32 will be dropped with the buffer reallocation block 36 by-passed.

When the buffer reallocation block 36 is enabled, if the queue admission control block 34 has decided to drop the ingress packet 32, then the buffer reallocation block 36 determines if any space can be created for this ingress packet 32 by dropping lower priority packets in the egress queue 12, and, if not, simply drop the ingress packet 32. The buffer reallocation block 36 can receive a read/write command from the queue admission control block 34 along with the dropped ingress packet 32. The queue admission control block 34 maintains some extra information along with existing information, and the buffer reallocation block 36 uses this information to drop the lower priority frames. The buffer reallocation block 36 also updates the queue admission control block 34 about its decision so that a congestion avoidance block can use the updated information regarding frame drops in the next congestion time window.

As already mentioned herein, the egress queues 12 are made of a link-list of packet pointers, so once the buffer reallocation block 36 has decided to drop the lower priority frames, the link-list of packet pointers is updated by deleting the nodes from the list and the corresponding packet buffer 16 from the shared packet buffer pool is freed. The buffer memory and packet pointers which got freed by the lower priority frames will be used by the higher priority frames to enqueue the ingress packet 32.

Improved Packet Drop Decision Process

Figure 4:
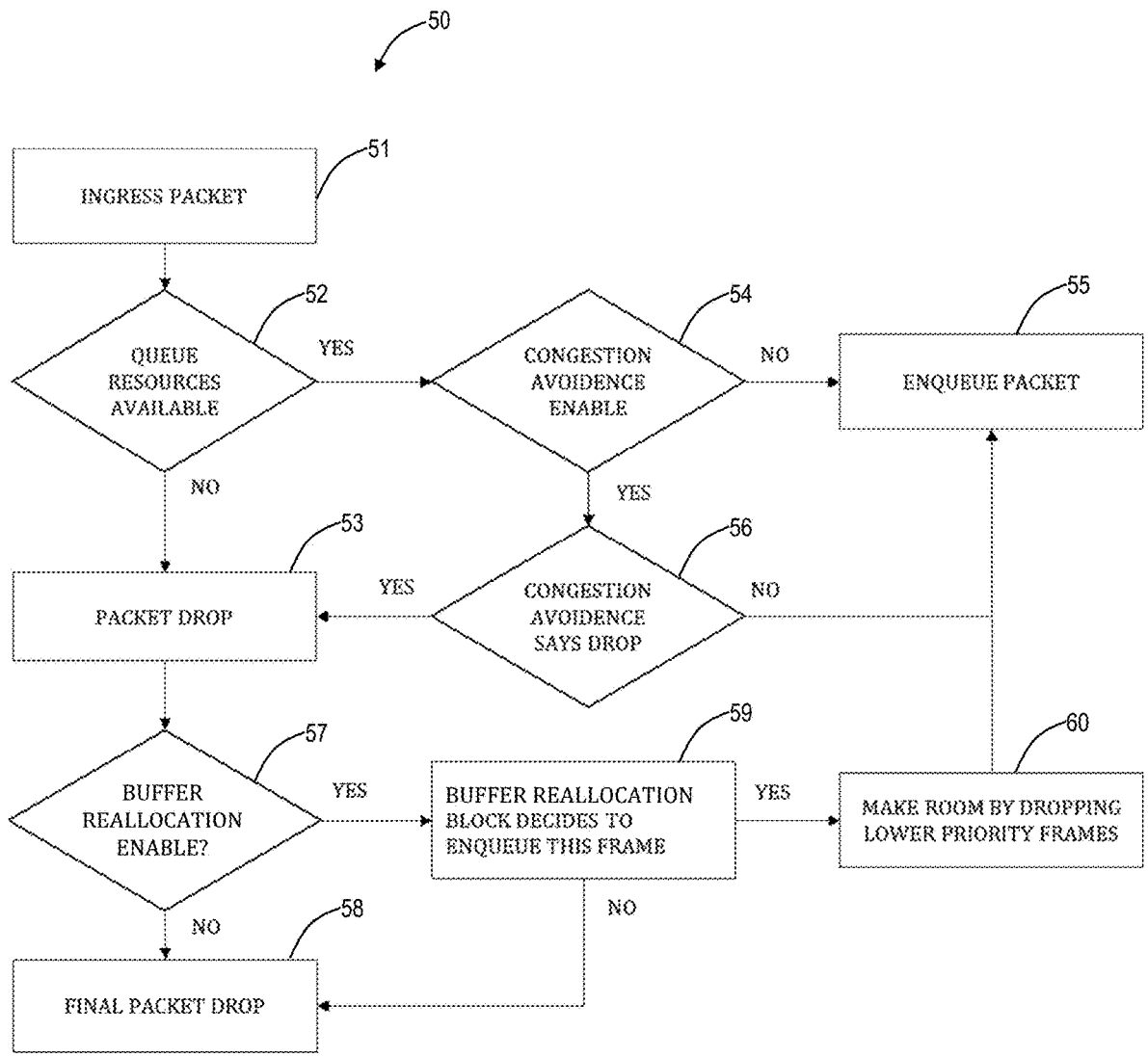
FIG. 4 is a flowchart of an improved packet drop decision process.

FIG. 4 is a flowchart of an improved packet drop decision process 50. The improved packet drop decision process 50 can be implemented via the queue admission system 30 in a packet switch 10. In the improved packet drop decision process 50, when an ingress packet having priority "P" arrives at the packet switch 10 and an egress queue 12 is assigned based on the priority P (step 51). The priority P can be any value that differentiates packets, e.g., numerical, color, etc. The improved packet drop decision process 50 includes verifying if there are available queue resources (step 52). If there are not enough queue resources available (step 52), there is a determination to drop the packet (step 53).

If enough queue resources are available (step 52) and congestion avoidance is not enabled (step 54), then the packet is enqueued (step 55). If enough queue resources are available (step 52) and congestion avoidance is enabled (step 54), then congestion avoidance determines if the packet needs to be enqueued or dropped (step 56). If congestion avoidance determines no drop is required (step 56), then the packet is enqueued (step 55).

If it is decided to drop the packet (step 56), there is a determination to drop the packet (step 53). After the determination to drop the packet (step 53), the buffer reallocation block can be checked (step 57). If the buffer reallocation block is not enabled, the determination to drop the packet is final (step 58). If the buffer reallocation block is enabled (step 57), then the buffer reallocation block performs queue modification (step 59). If the queue modification is unsuccessful, the determination to drop the packet is final (step 58). The queue modification can make room in the queue by dropping lower priority packets, i.e., packets having priority less than "P" (step 60), and the packet is enqueued (step 55).

Example Operations

Figure 5:
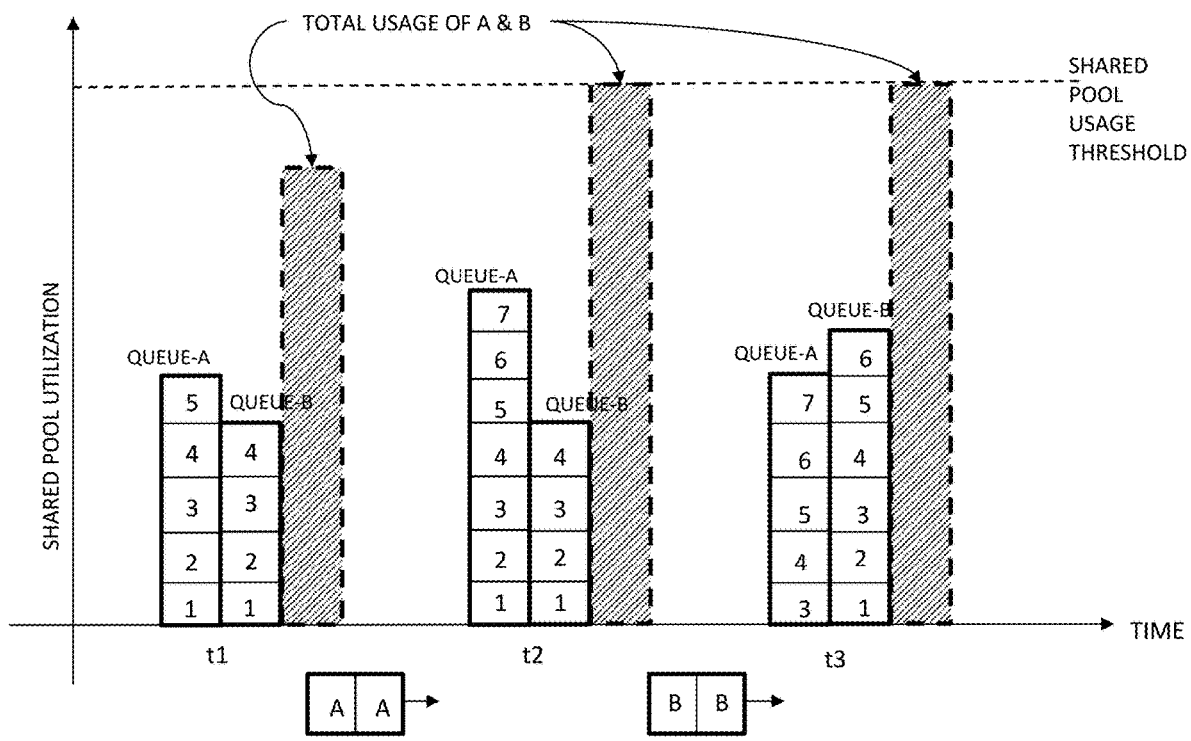
FIG. 5 is a graph of two queues A, B and their usage of a packet buffer over time, illustrating the improved packet drop decision process of FIG. 4.

FIG. 5 is a graph of two queues A, B and their usage of a packet buffer over time, illustrating the improved packet drop decision process 50. FIG. 5 illustrates a simplified example for illustration purposes where there are two egress queues A, B with queue A for low priority and queue B for high priority. That is, queue A has less precedence than queue B in the system, and the packet buffer is shared among these egress queues. At time t1, the total usage of the packet buffer by both of the queues A, B is below a usage threshold. At time t2, new packets are enqueued in the queue A, meeting the usage threshold. Now, if a packet arrives for queue B after time t2, this will have to be dropped due to the usage threshold. With the improved packet drop decision process 50, at time t3, two new packets arrive for queue B, i.e., queue B needs buffer space. Instead of dropping the two new packets for queue B, two of the head packets are discarded from queue A, allowing the two new packets for queue B to be enqueued.

The improved packet drop decision process 50 also is effective in handling high priority bursty traffic, where a sudden burst of high priority traffic may get dropped because of unavailability of the buffer resources for the egress queue.

Figure 6:
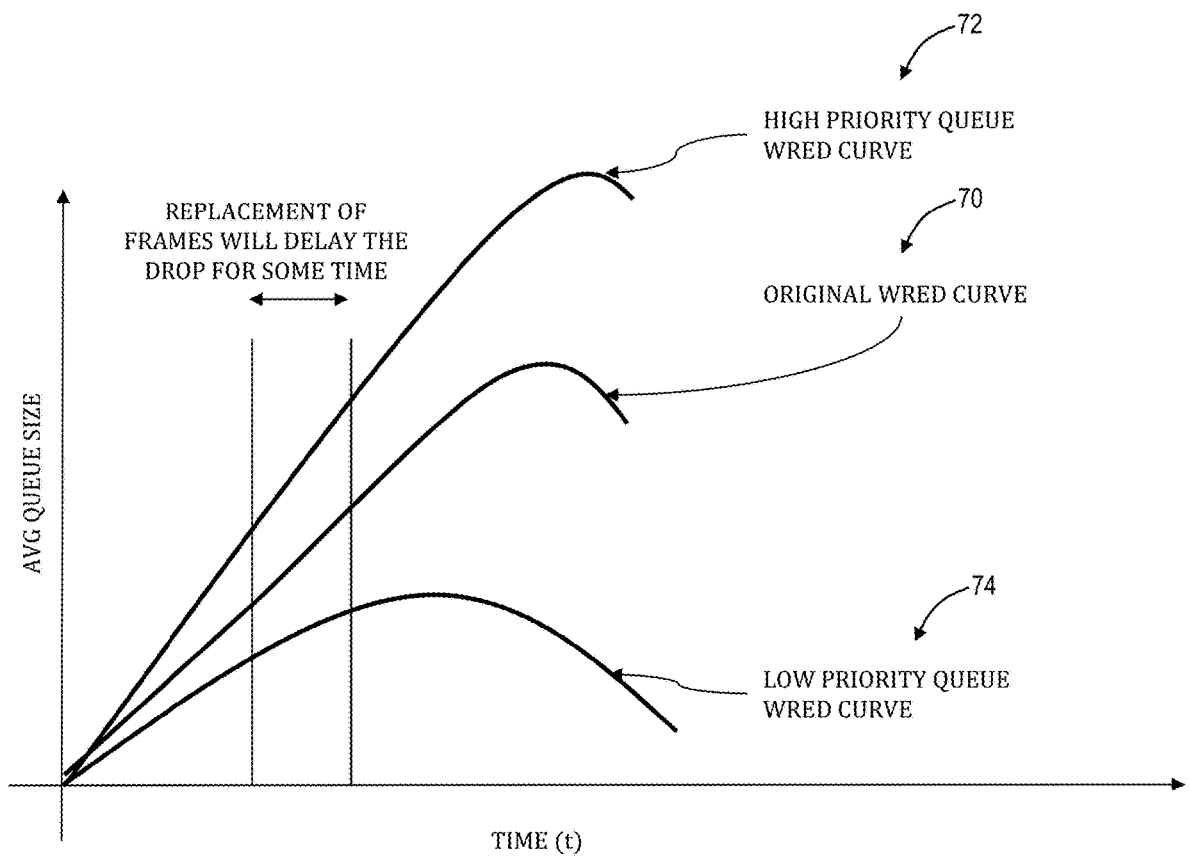
FIG. 6 is a graph of average queue size over time to illustrate the effect of the improved packet drop decision process of FIG. 4 on a WRED curve.

FIG. 6 is a graph of average queue size over time to illustrate the effect of the improved packet drop decision process 50 on a WRED curve. The original WRED curve 70 and modified curves 72, 74 are displayed for the comparison purpose. If the "drop decision" of WRED is overwritten by the buffer reallocation block, then the average queue length calculated by the WRED will increase slightly for high priority queue (modified curve 72) whereas it will decrease for low priority queue (modified curve 74) because of the extra buffers allocated to the high priority egress queue, assuming overall share of the high priority queue increases from the shared buffer pool. Whereas the overall share will be decreased for the low priority queue.

Simulation Observations

Figure 7:
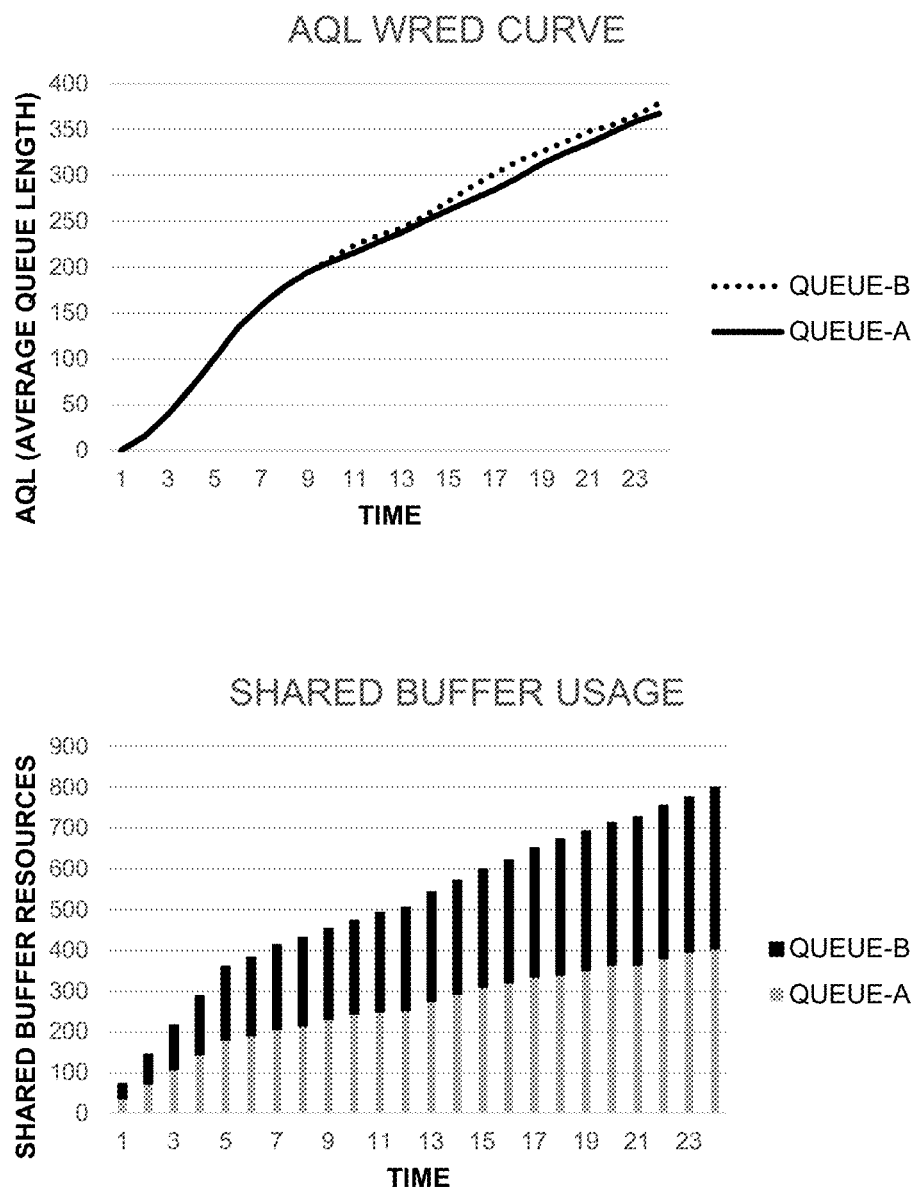
FIG. 7 is graphs of Average Queue Length (AQL) over time and shared buffer usage over time for an original WRED approach (unmodified)
Figure 8:
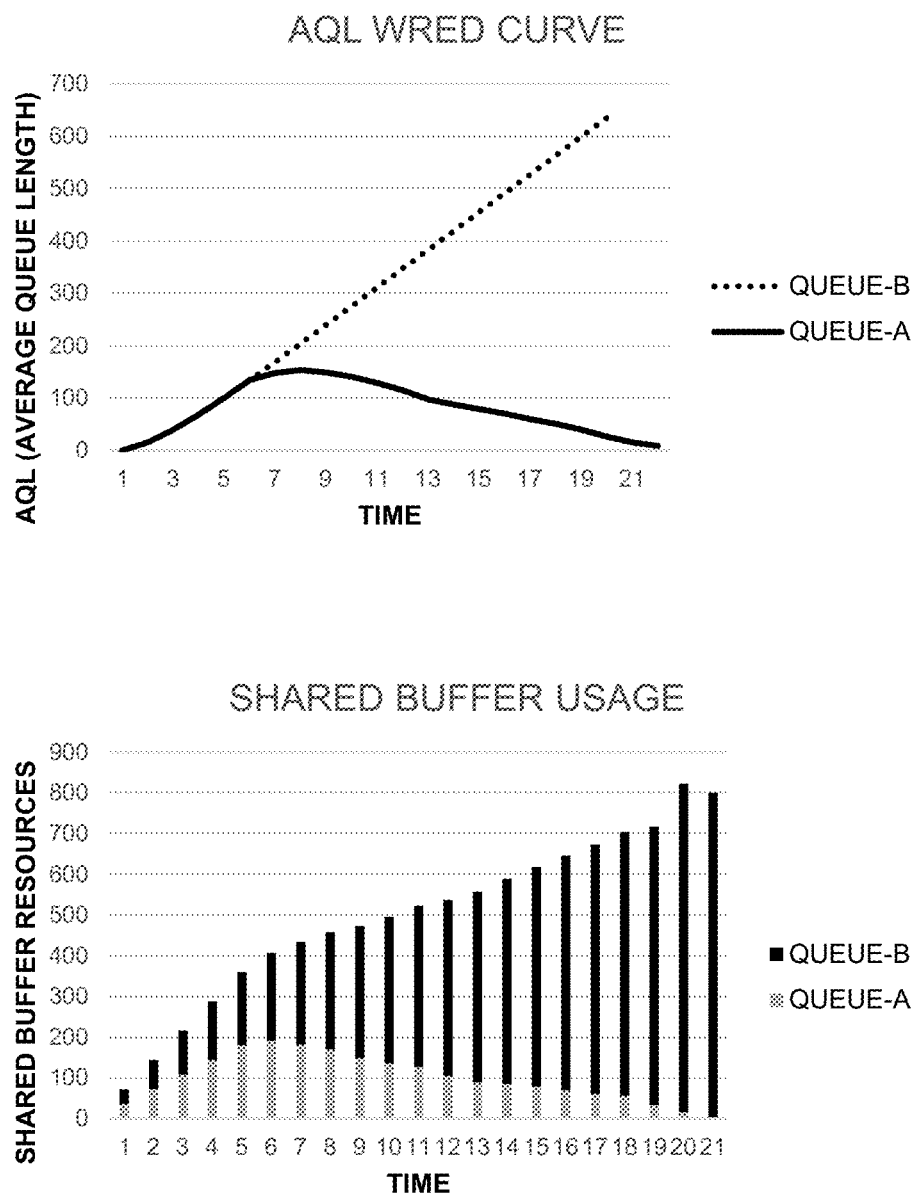
FIG. 8 is graphs of AQL over time and shared buffer usage over time utilizing the improved packet drop decision process of FIG. 4 with WRED.

FIG. 7 is graphs of Average Queue Length (AQL) over time and shared buffer usage over time for an original WRED approach (unmodified). FIG. 8 is graphs of AQL over time and shared buffer usage over time utilizing the improved packet drop decision process 50 with WRED. A simulator was configured to observe the impact of the improved packet drop decision process 50 on the WRED curve. Observations have been taken for two queues, one is a high priority (queue B), and the other is a low priority (queue A). In the simulations, total shared buffer resources are taken as 800 frame buffers and initially 800 frame buffers are available for queue A as well as for queue B, the incoming frame rate is 150 frames/time-interval, and the egress shaper rate is configured as 100 frames/time-interval to simulate the congestion for each queue (that means both queues A, B have the same incoming and egress rate). The WRED configuration parameters are configured including the minimum threshold set to 20%, and the maximum threshold is set to 100% of actual queue size (frame buffers available for the queue at time t), drop probability as 20%.

In FIGS. 7 and 8, the top graph illustrates AQL over time. It is shown that the AQL of high priority queue (queue B) is increased whereas AQL of low priority queue is decreased when compared with "original WRED" curve. The bottom is plotted between shared buffer resources and how the shared frame buffers are allocated among both the queues (queues A, B). It is shown that when the improved packet drop decision process 50 is not used, then the shared buffer is almost equally distributed among both the queues A, B. And when the improved packet drop decision process 50 is used, then shared frame buffers are distributed equally but then high priority queue starts eating the space from the low priority queue, and high priority queue takes maximum share of shared frame buffers.

Figure 9:
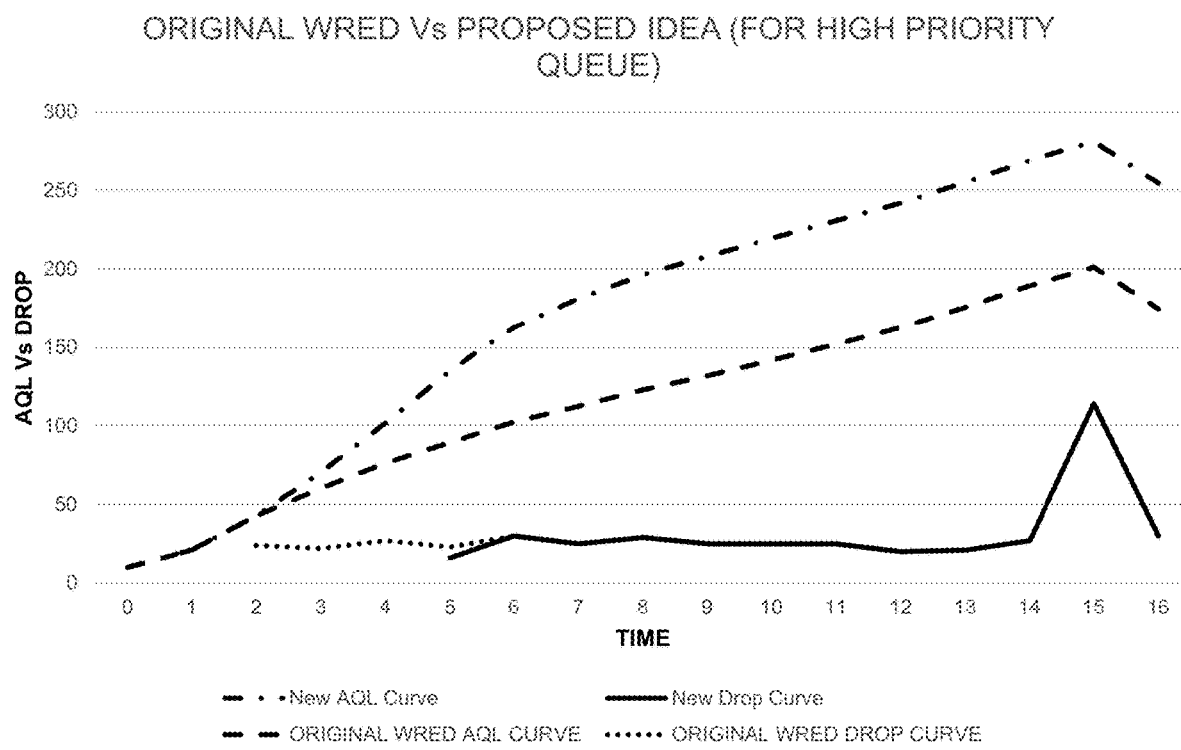
FIG. 9 is a graph of a simulation of the improved packet drop decision process for high priority queue bursty traffic.

FIG. 9 is a graph of a simulation of the improved packet drop decision process 50 for high priority queue bursty traffic. Here it is assumed that some of the shared buffers are already occupied by the lower priority queue A at a time when a burst of high priority traffic (queue B) arrives. For illustration, the shared buffer pool is shared only by queue A and queue B, and the total shared buffer used in the simulation is fixed to 280 frame buffers, some frame buffers are reserved for headroom when the average queue length reaches its maximum. Out of these 280 frame buffers, 80 frame buffers are already occupied by the lower priority queue A and 200 are available for queue A and queue B. As the burst of high priority traffic is simulated, all the available buffers will be consumed by the high priority queue as no low priority traffic is coming. The incoming frame rate is 150 frames/time-interval, and the egress shaper rate is configured as 100 frames/time-interval for high priority queue (queue-B) to simulate the congestion.

With the above simulation environment, FIG. 9 shows that in the case of congestion, the frame drop is delayed. Also, the average queue length curve shifts because of the more frame buffers usage by the queue B. In the simulation, the original WRED AQL curve has a maximum of 200 frames buffers used by the high priority burst whereas when the improved packet drop decision process 50 is used then 280 frame buffers are used (extra 80 which were occupied by lower priority) and accordingly min, and max WRED threshold is adjusted.

Queue Admission Control Based on Precedence

Figure 10:
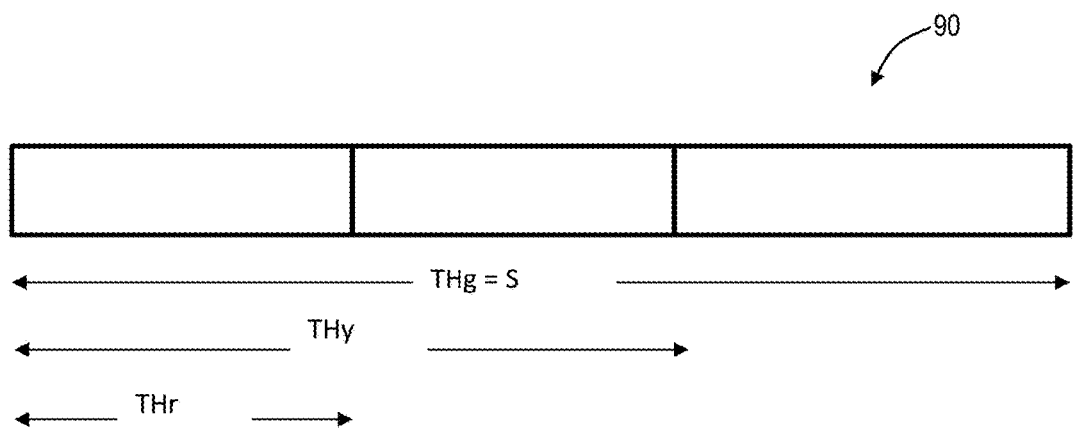
FIG. 10 is a block diagram illustrating a queue and available thresholds for red, yellow and green color frames.

Color-based tail drop is one of the most used techniques where relative precedence is considered in the case of congestion. Generally, packets are marked as "green," "yellow," and "red" color in the device, where red has the highest and green has the lowest drop precedence. In this mechanism, different queue-depth thresholds can be configured for green, yellow, and red color packets and if the queue-depth is reached to the threshold point, then all the frames marked with the associated color will be dropped. So, if the queue size of any queue is configured as S and thresholds for red, yellow and green color frames are THr, THy, and THg respectively then (THg=S)>THy>THr. FIG. 10 is a block diagram illustrating a queue 90 and available thresholds for red, yellow, and green color frames.

FIG. 10 shows that the queue 90 is divided to give precedence to lower over higher drop precedence frames. The issue here is that frames with lower drop precedence cannot utilize the full queue length even if no higher precedence frame come at that time. So, in this technique, the queue size is divided based on the relative precedence, and the queue size is not fully utilized. Also, the classification of flows is also limited to only 3 types (red, yellow, and green).

Another known solution could be class-based or flow-based queueing. In flow-based queueing, each identified flow is assigned to a separate queue and all the queue properties such as scheduling, WRED, shaping, etc will be applied to each individual flow-based queue. As the number of queues required is more, so in case of scaled system and congested situation either more packet buffers are required, or the queue sizes will be smaller where the equal share of buffers will be provided to each queue in the system. As the flows are directed to different queues, the precedence to access the shared packet buffer resource cannot be guaranteed among different flows which required the same type of quality of service, also complicated hierarchical scheduling will be required.

In an embodiment, the present disclosure includes providing different treatment to different flows based on relative precedence within the same queue in case of congestion. So, even if the queue is full, higher precedence frames can be enqueued, and lower precedence frames will be dropped irrespective of the packet arrival time.

Figure 11:
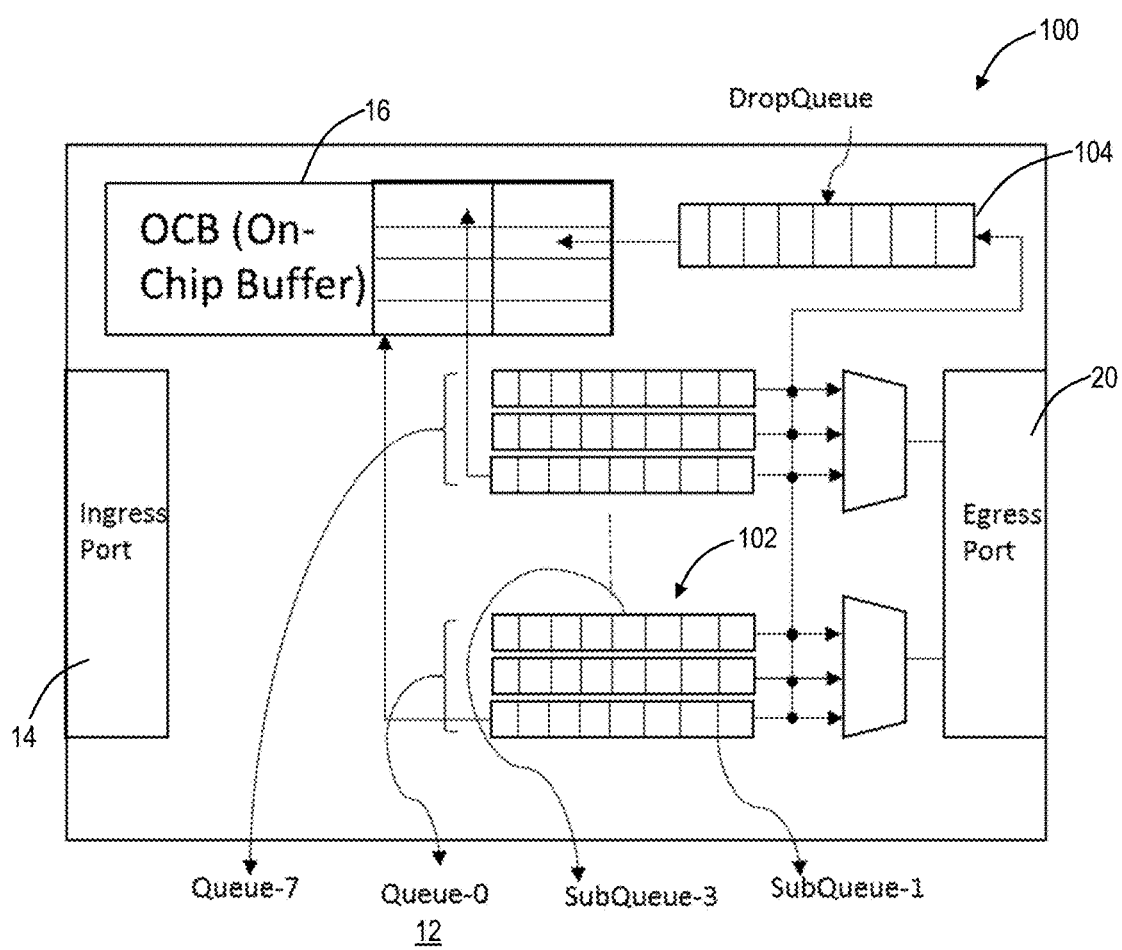
FIG. 11 is a block diagram of a packet switch with queues and subQueues.

FIG. 11 is a block diagram of a packet switch 100 with egress queues 12 and subQueues 102. The packet switch 100 can selectively drop lower precedence frames first when frames belonging to a higher precedence flow arrive, and the egress queue 12 is already marked as "full." For this behavior, a single egress queue 12 is divided into multiple subQueues 102 based on the precedence-class and a dropQueue 104 is needed where frames can be pushed which need to be dropped so that the packet buffer 16 can be made available for higher precedence-class frames in the case of congestion.

FIG. 11 illustrates how the subQueues 102 are attached to the egress port 20 and the dropQueue 104. For illustration purposes, only three subQueues 102 are displayed which are attached to the egress port 20. It is also shown that each subQueue 102 can access the dropQueue 104 and pushed those frames which need to be dropped. The subQueues 102 are assigned based on the precedence-class. Assigning the precedence-class is an ingress logic which is also known as "classification" and "marking." Ingress packets can be classified based on different fields in the packets such as source/destination IP address, Virtual Local Area Network (VLAN), Transmission Control Protocol (TCP) port (Telnet, SSH frames), Media Access Control (MAC) address, etc. along with actual r-cos (resolved Class of Service (CoS)) to assign to different subQueues 102 within the egress queue 12. Based on the ingress marking, packets can be assigned to a different subQueue 102.

As described herein, before enqueueing a packet to the egress queue 12, several admission control tests are performed. If the packet passes the admission control test, then it is enqueued, else it is dropped. In an embodiment, a new queue admission control test is proposed. SubQueues 102 are defined like other queues and shall maintain the following statistics to decide if a packet can be enqueued or dropped. The following parameters are defined for each subQueue 102 and used by the new queue admission control test $AQS_y^x(t)$—"Available Queue Size" for subQueue(y) of egress queue(x) at time t. This parameter is used to maintain the current availability of the resources for each subQueue. When AQS is set to zero, there no resources are available, and any packet required to be enqueued to this subQueue will be dropped.

$UQS_y^x(t)$—"Used Queue Size" by the subQueue(y) of egress queue(x) at time t. This parameter maintains the current usage of the resources for each subQueue. If UQS is set to zero, then no resources are in use by the corresponding subQueue.

$TQS^x(t)$—"Total Queue Size" is the allocated (configured) queue size for egress queue(x) at time t. This parameter is maintained for per egress queue basis. The value of this parameter is shared among all the subQueues attached to queue. Any subQueue attached to the egress queue can use maximum resources up to TQS value but the combined usage of all the subQueues should NOT go more than TQS value.

Processes for Queue Admission Control Based on Precedence

Figure 12:
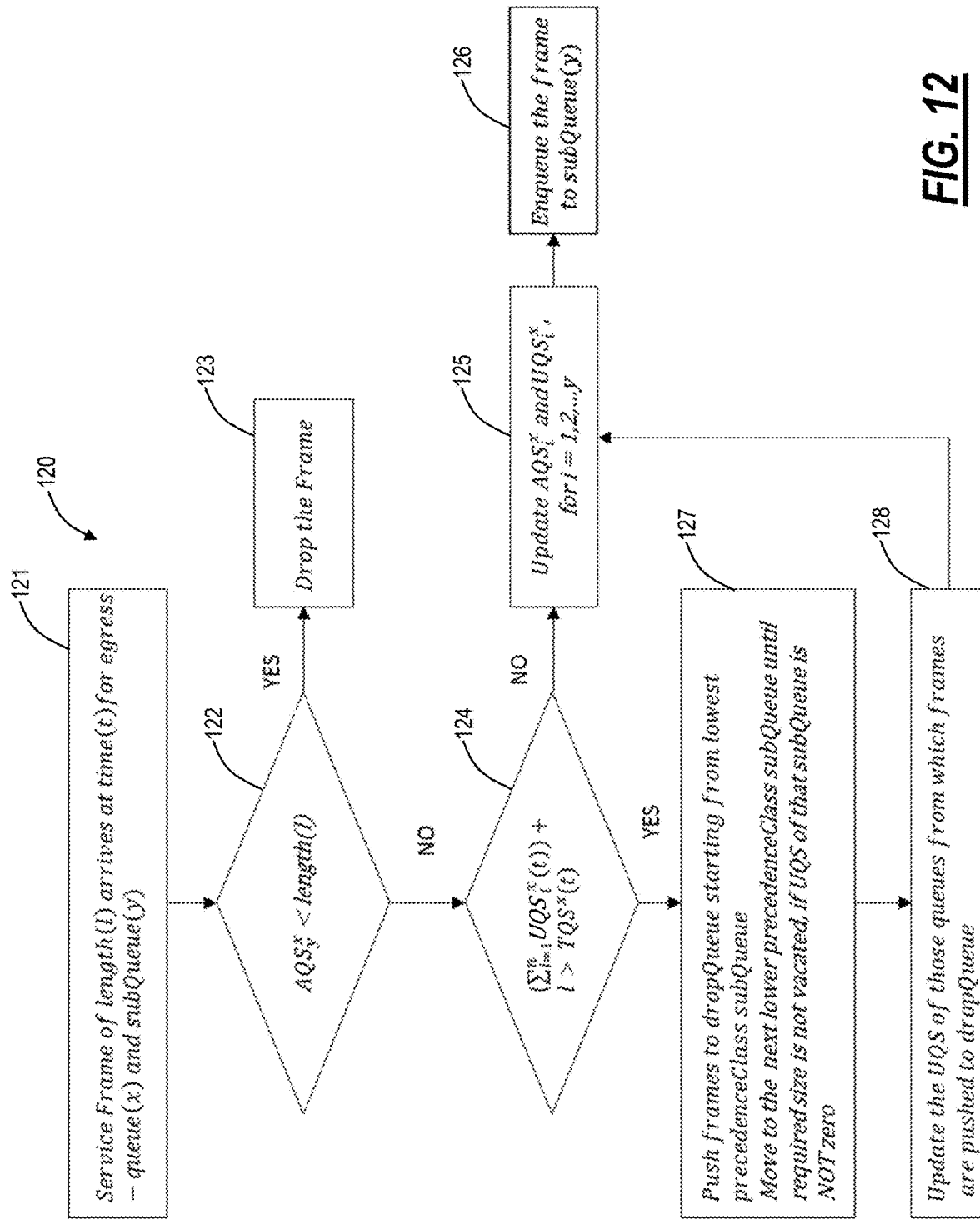
FIG. 12 is a flowchart of a process of enqueuing frames in the packet switch of FIG. 11 using the subQueues.

FIG. 12 is a flowchart of a process 120 of enqueuing frames in the packet switch 100 using the subQueues 102. Here, the egress queue is denoted as "x," and the "n" subQueues are attached to the egress queue which are denoted as "y" for y=1, 2, 3 . . . n, where subQueue (n) is mapped to the "highest" precedence-class frames and subQueue (1) to the lowest precedence-class frames. Initially, all the subQueues can use shared resource up to the "total queue size" value. If the size of the frame to be enqueued is less than the "available queue size" of the corresponding subQueue, then the frame can be enqueued even if total "used queue size" of all the subQueues is equal to or reaching near "total queue size," otherwise the frame will be dropped.

In FIG. 12, the process 120 begins where a service frame of length (l) arrives at the time (t) for egress queue (x) and subQueue (y) (step 121). If $AQS_y^x$ is less than length (l) (step 122), the frame is dropped (step 123). If $AQS_y^x$ is not less than length (l) (step 122), the process 120 includes checking if the summation of all of the used queue sizes plus length (l) is greater than $TQS^x(t)$ (step 124). If not (step 124), the process 120 includes updating $AQS_i^x$ and $UQS_i^x$ for i=1, 2, . . . , y (step 125) and enqueuing the frame to subQueue (y) (step 126).

If so (step 124), the process 120 includes pushing frames to the dropQueue starting from the lowest precedence class in the subQueue as well as moving to the next lower precedence class in the subQueue until the required size is vacated (step 127). The process 120 includes updating the UQS of those queues from which frames were pushed to the dropQueue (step 128) and returning to step 125.

Figure 13:
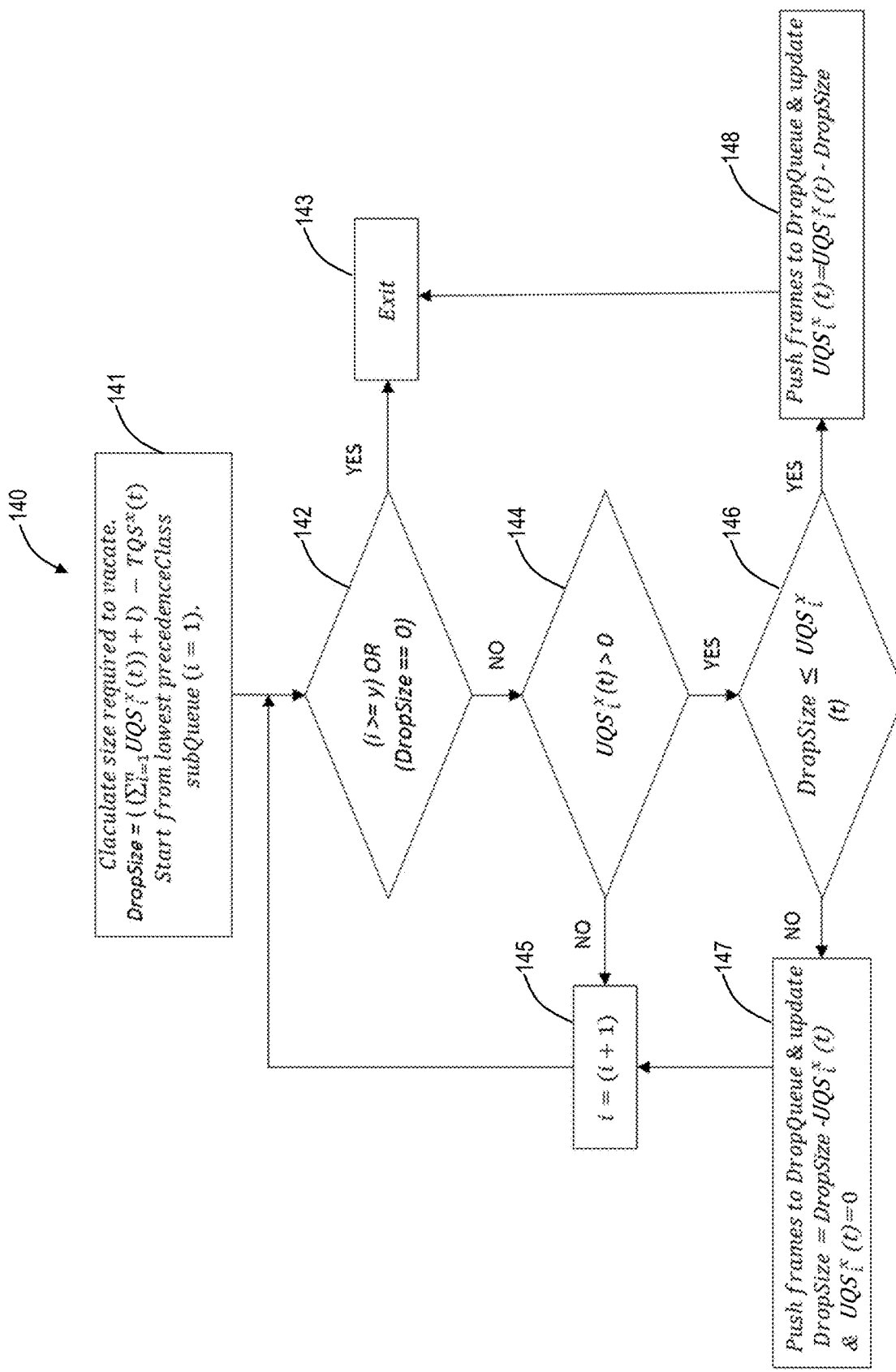
FIG. 13 is a flowchart of a process illustrating how the packet buffers are made available to accommodate higher precedence frames and pushing frames, mapped to lower precedence subQueues to the dropQueue.

FIG. 13 is a flowchart of a process 140 illustrating how the packet buffers are made available to accommodate higher precedence frames and pushing frames, mapped to lower precedence subQueues to the dropQueue. The process 140 includes calculating the size required to vacate (step 141). The DropSize can equal a sum of all of the $UQS_i^x$ plus the length (l) minus $TQS^x(t)$. This starts from the lowest precedence class subQueue (i=1).

If i is greater than or equal to y or the DropSize is 0 (step 142), the process 140 exits (step 143). Otherwise (step 142), if $UQS_i^x(t)$ is not greater than 0 (step 144), the process 140 includes incrementing i (step 145) and returning to step 142. If $UQS_i^x(t)$ is greater than 0 (step 144), if the Drop Size is greater than $UQS_i^x(t)$ (step 146), then the process 140 includes pushing frames to the dropQueue and updating the DropSize (step 147) and going to step 145. If the DropSize is less than or equal to $UQS_i^x(t)$ (step 146), then the process 140 includes pushing frames to the dropQueue and updating $UQS_i^x(t)$ (step 148), and exiting (step 143).

Example Results for Queue Admission Control Based on Precedence

Figure 14:
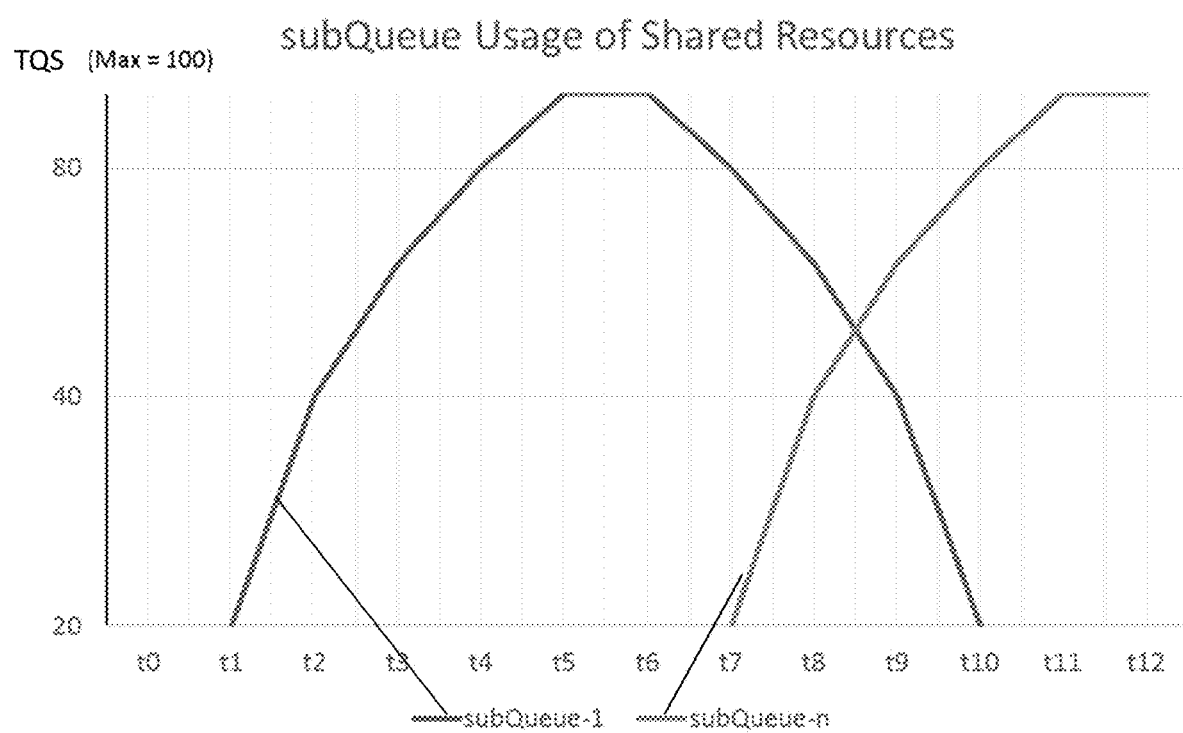
FIG. 14 is a graph of resource usage of subQueue (1) and subQueue(n)

When there are frames arriving only for subQueue (1), then it can use the resources up to TQS value, but when frames for subQueue (2) or higher start arriving, then subQueue (1) frames can start dropping. FIG. 14 is a graph of resource usage of subQueue (1) and subQueue(n). It is shown in FIG. 14 that when higher precedence-class usage of "total queue resources" increases then lower precedence-class decreases and at any point of time, "total" usage does not exceed the total allocated resources of the egress queue.

Dequeue Process from a SubQueue

Figure 15:
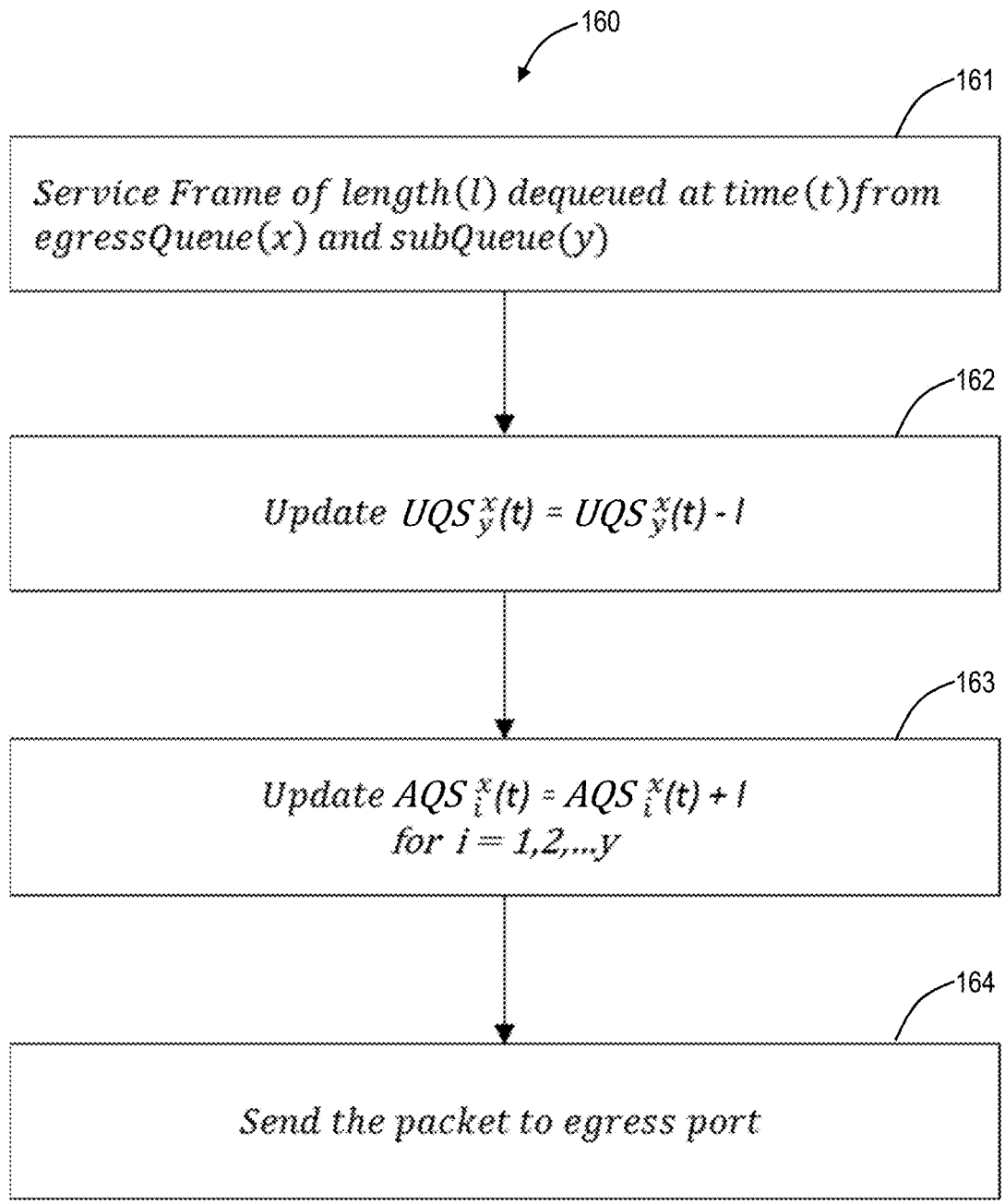
FIG. 15 is a flowchart of a dequeuing process from the subQueue.

FIG. 15 is a flowchart of a dequeuing process 160 from the subQueue. For the dequeuing process 160, whenever a frame is dequeued from the subQueue then update the "used queue size" of the corresponding subQueue and update the "available queue size" for the corresponding subQueue and all the lower precedence-class subQueues. Specifically, when a service frame of length (l) is dequeued at the time (t) from the express queue (x) and subQueue (y) (step 161), $UQS_y^x(t)$ is updated to subtract length (l) (step 162), $AQS_i^x(t)$ is updated (step 163), and the packet is sent to the egress port (step 164).

Example Operation

A simple example is described for illustration purposes. A packet switch 100 is configured such as a way that egress port is configured with 7 queues and r-cos to queue mapping is configured as 1:1 (r-cos-0 is mapped to queue-0, r-cos-1 to queue-1 and so on). The ingress port is receiving traffic from example source IP addresses 2.2.2.2, 2.2.2.1, 3.3.3.3, 3.3.3.1, 4.4.4.4 & 4.4.4.1. Also, traffic is marked with 0-63 Differentiated Services Code Point (DSCP) values. Traffic resolved cos (r-cos) is assigned based on DSCP values, such as DSCP 0-7 is mapped to r-cos-0, DSCP 8-15 is mapped to 1, and so on.

Now define the precedence-class based on source IP address as follows

| | |
|---|---|
| Source IP address 2.2.2.2 & 2.2.2.1 | precedence-class-1 |
| Source IP address 3.3.3.3 & 3.3.3.1 | precedence-class-2 |
| Source IP address 4.4.4.4 & 4.4.4.1 | precedence-class-3 |

So now for the same egress queue, packets with source IP address 4.4.4.4 & 4.4.4.1 will get higher precedence over frames having a source IP address 2.2.2.2 & 2.2.2.1 in case of congestion. "total queue size" is configured as 100.

Based on the precedence-class, the subQueue will be assigned, and it is shown in the table in FIG. 16 that which frames are enqueued and which are dropped. Frames belong to different flows arrive at different time intervals and based on the precedence and "total used queue" or available queue resources frames are dropped or enqueued.

Packet Switch Process

Figure 17:
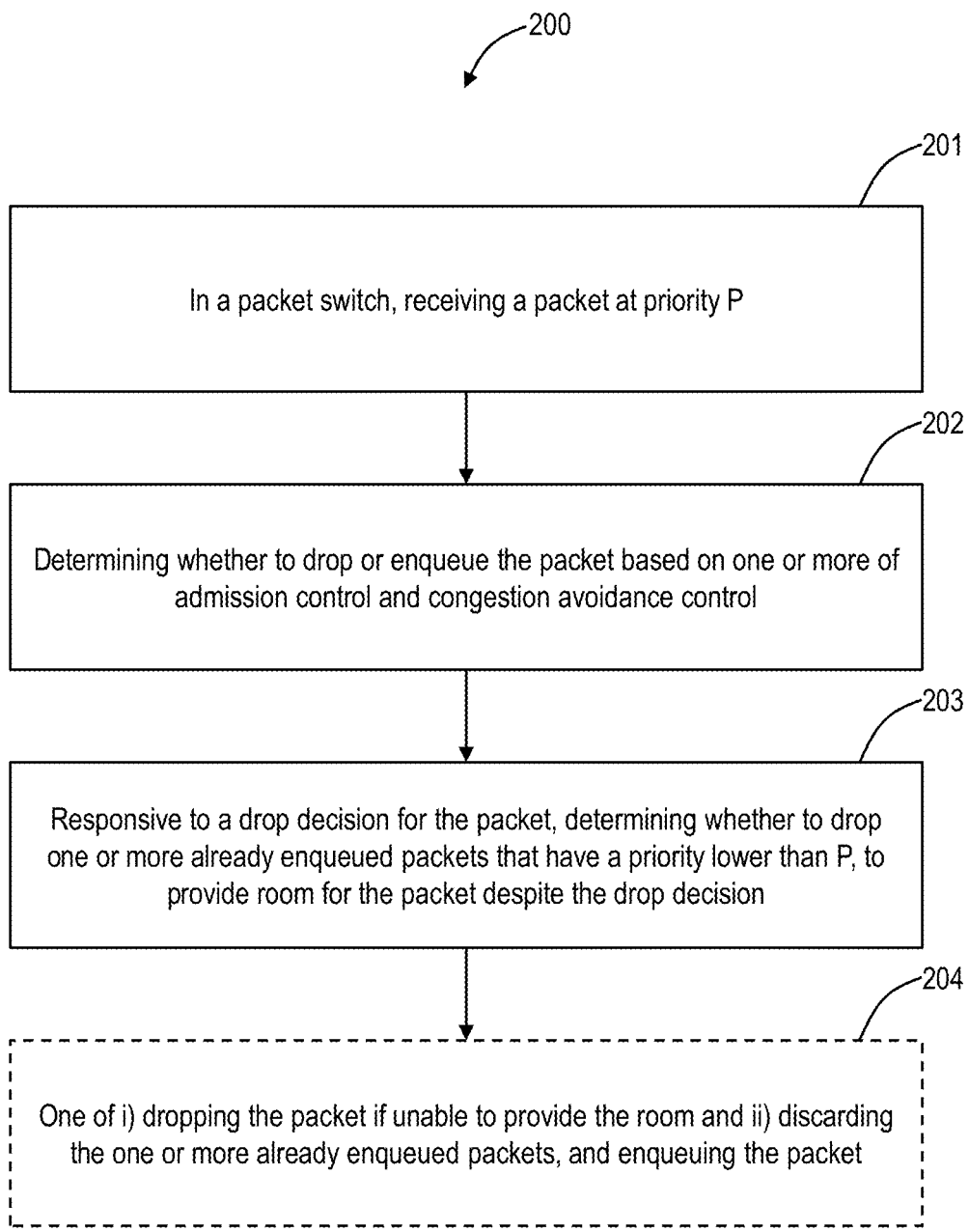
FIG. 17 is a flowchart of a packet switch process.

FIG. 17 is a flowchart of a packet switch process 200. The packet switch process 200 includes, in a packet switch, receiving a packet at priority P (step 201); determining whether to drop or enqueue the packet based on one or more of admission control and congestion avoidance control (step 202); and, responsive to a drop decision for the packet, determining whether to drop one or more already enqueued packets that have a priority lower than P, to provide room for the packet despite the drop decision (step 203). The packet switch process 200 can include one of i) dropping the packet if unable to provide the room and ii) discarding the one or more already enqueued packets, and enqueuing the packet (step 204).

The drop decision can be based on the congestion avoidance control, and the drop decision is revisited subsequently to dropping the drop one or more already enqueued packets. The drop decision can be based on admission control without the congestion avoidance control, and the drop decision is a tail drop decision. The packet switch can include a plurality of queues each supporting a different priority level, and the one or more already enqueued packets are in a different queue than the packet. The packet switch can include a queue supports packets each having different priority levels, and wherein the dropping is performed in the queue.

In another embodiment, a packet switch includes an ingress port; queue admission control circuitry connected to the ingress port; one or more egress queues configured to manage packet buffers; and an egress port connected to the packet buffers, wherein the packet buffers are managed such that already queued lower priority packets are discarded from the packet buffers when it is required to drop higher priority packets. The packet switch can further include buffer reallocation circuitry connected to the queue admission control circuitry, wherein the buffer reallocation circuitry is configured to cause discard of the already queued lower priority packets to support the higher priority packets.

In a further embodiment, an apparatus includes queue admission control circuitry configured to receive a packet at priority P, and determine whether to drop or queue the packet in packet buffers; and buffer reallocation circuitry configured to discard one or more already queued packets in the packet buffers responsive to a drop decision from the queue admission control circuitry for the packet, wherein the one or more already queued packets have a lower priority than priority P.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A packet switch comprising:
   an ingress port;
   queue admission control circuitry connected to the ingress port;
   one or more egress queues configured to manage packet buffers; and
   an egress port connected to the packet buffers, wherein the packet buffers are managed such that lower priority packets already queued in the one or more egress queues are discarded from the packet buffers in response to a determination by the queue admission control circuitry to drop higher priority packets received at the ingress port that should otherwise be accepted in the packet buffers and in response to a determination by buffer reallocation circuitry to overwrite a drop decision by the queue admission control circuitry.

2. The packet switch of claim 1, wherein the buffer reallocation circuitry is connected to the queue admission control circuitry, wherein the buffer reallocation circuitry is configured to cause discard of the lower priority packets to support the higher priority packets, such that a given high priority packet replaces a given low priority packet through manipulation of pointers.

3. The packet switch of claim 1, wherein the queue admission control circuitry is configured to determine if a packet should be dropped or not, and the queue admission control circuitry communicates to buffer reallocation circuitry that is configured to discard one or more lower priority packets to support the packet.

4. The packet switch of claim 1, wherein the queue admission control circuitry performs congestion avoidance, and, responsive to a decision to queue a higher priority packet from the congestion avoidance, buffer reallocation circuitry is configured to make room in the packet buffers by discarding the lower priority packets.

5. The packet switch of claim 1, wherein the queue admission control circuitry does not perform congestion avoidance, and, responsive to a tail drop decision of a higher priority packet, buffer reallocation circuitry is configured to make room in the packet buffers by discarding the lower priority packets.

6. The packet switch of claim 1, wherein the one or more egress queues are linked lists to the packet buffers and the discard is performed by removing nodes in the linked lists.

7. The packet switch of claim 1, wherein the one or more egress queues include a plurality of queues each supporting a different priority level.

8. The packet switch of claim 1, wherein a queue of the one or more egress queues supports packets each having different priority levels, and wherein the packet buffers are managed by discarding already queued lower priority packets in the queue when it is required to discard a higher priority packet that has not been queued yet in the queue.

9. An apparatus comprising:
queue admission control circuitry configured to receive a packet at priority P at an ingress port, and determine whether to drop or queue the packet in packet buffers; and
buffer reallocation circuitry configured to discard one or more packets already queued in the packet buffers responsive to a drop decision to drop the packet at priority P from the queue admission control circuitry for the packet and with no room in the packet buffers, wherein the one or more packets already queued in the packet buffers have a lower priority than priority P, wherein the buffer reallocation circuitry is configured to overwrite the drop decision by the queue admission control circuitry, and wherein the buffer reallocation circuitry is configured to replace a given low priority packet with a given high priority through manipulation of pointers.

10. The apparatus of claim 9, wherein the queue admission control circuitry performs congestion avoidance, and, responsive to the decision from the congestion avoidance of a higher priority packet, the buffer reallocation circuitry is configured to make room in the packet buffers by discarding the one or more already queued packets.

11. The apparatus of claim 9, wherein the queue admission control circuitry does not perform congestion avoidance, and, responsive to a tail drop decision of a higher priority packet, the buffer reallocation circuitry is configured to make room in the packet buffers by discarding the one or more already queued packets.

12. The apparatus of claim 9, further comprising one or more egress queues that are linked lists to the packet buffers and the discard is performed by removing nodes in the linked lists.

13. The apparatus of claim 9, wherein the packet buffers are managed by a plurality of egress queues each supporting a different priority level.

14. The apparatus of claim 9, wherein the packet buffers are managed by a queue of one or more egress queues that supports packets each having different priority levels, and wherein the packet buffers are managed by discarding already queued packets in the queue when it is required to discard a higher priority packet that has not been queued yet in the queue.

15. A method comprising:
in a packet switch, receiving a packet at priority P at an ingress port;
determining whether to drop or enqueue the packet based on one or more of admission control and congestion avoidance control associated with packet buffers; and
responsive to a decision to drop the packet at priority P and with no room in the packet buffers, determining whether to overwrite the decision and to drop one or more packets already queued in the packet buffers and that have a priority lower than P, to provide room for the packet at priority P despite the drop decision.

16. The method of claim 15, further comprising:
one of i) dropping the packet if unable to provide the room and ii) discarding the one or more already enqueued packets, and enqueuing the packet.

17. The method of claim 15, wherein the decision is based on the congestion avoidance control and the decision is revisited subsequently to drop one or more already enqueued packets.

18. The method of claim 15, wherein the decision is based on admission control without the congestion avoidance control, and the decision is a tail drop decision.

19. The method of claim 15, wherein the packet switch includes a plurality of egress queues each supporting a different priority level, and the one or more already enqueued packets are in a different queue than the packet.

20. The method of claim 15, wherein the packet switch includes a queue that supports packets each having different priority levels, and wherein the dropping is performed in the queue.

* * * * *